Aug. 13, 1935. M. G. VAN ARSDALE ET AL 2,010,936
STOCKING AND METHOD OF MANUFACTURING THE SAME
Filed Oct. 3, 1931      8 Sheets-Sheet 2

Aug. 13, 1935.  M. G. VAN ARSDALE ET AL  2,010,936
STOCKING AND METHOD OF MANUFACTURING THE SAME
Filed Oct. 3, 1931  8 Sheets-Sheet 6

INVENTORS
Malcolm G. Van Arsdale &
BY Lawrence W. Griffin
Mock & Blum
ATTORNEYS.

Patented Aug. 13, 1935

2,010,936

UNITED STATES PATENT OFFICE 2,010,936

STOCKING AND METHOD OF MANUFACTURING THE SAME

Malcolm G. Van Arsdale, Short Hills, N. J., and Lawrence W. Griffis, Tonawanda, N. Y., assignors to Van Raalte Company, New York, N. Y., a corporation of New York Application October 3, 1931, Serial No. 566,780

7 Claims. (Cl. 66—178)

This invention relates to a new and improved method of manufacturing stockings, and to a new and improved stocking.

One of the objects of the invention is to provide an improved method of making a stocking in which the important parts of the stocking are made of warp-knit material.

Another object of the invention is to provide a method of manufacturing a stocking, the important parts of which are made of warp-knit material, in an economical manner.

Another object of the invention is to provide an improved stocking, the important parts of which are made of warp-knit material, the use of which is preferable to an ordinary knit-fabric, because the warp-knit material will not run. The ordinary knit fabric may be referred to as weft-knit fabric.

Another object of our invention is to provide a stocking in which the leg portion and the instep and the sole are made of an integral piece of warp-knit material, this warp-knit material being preferably reinforced at the rear of the angle portion.

Another object of our invention is to provide a new and improved method of manufacturing a stocking having a leg portion made of warp-knit material, and having other portions or sections made of ordinary weft knit material. For example, the toe and heel and the welt of the stocking may be made of weft knit material, connected in an improved manner to the leg section.

Other objects of our invention will be set forth in the following description and drawings which illustrate a preferred embodiment thereof, it being understood that the above general statement of the objects of this invention is intended merely to generally explain the same and not to limit it in any manner.

Figure 1:
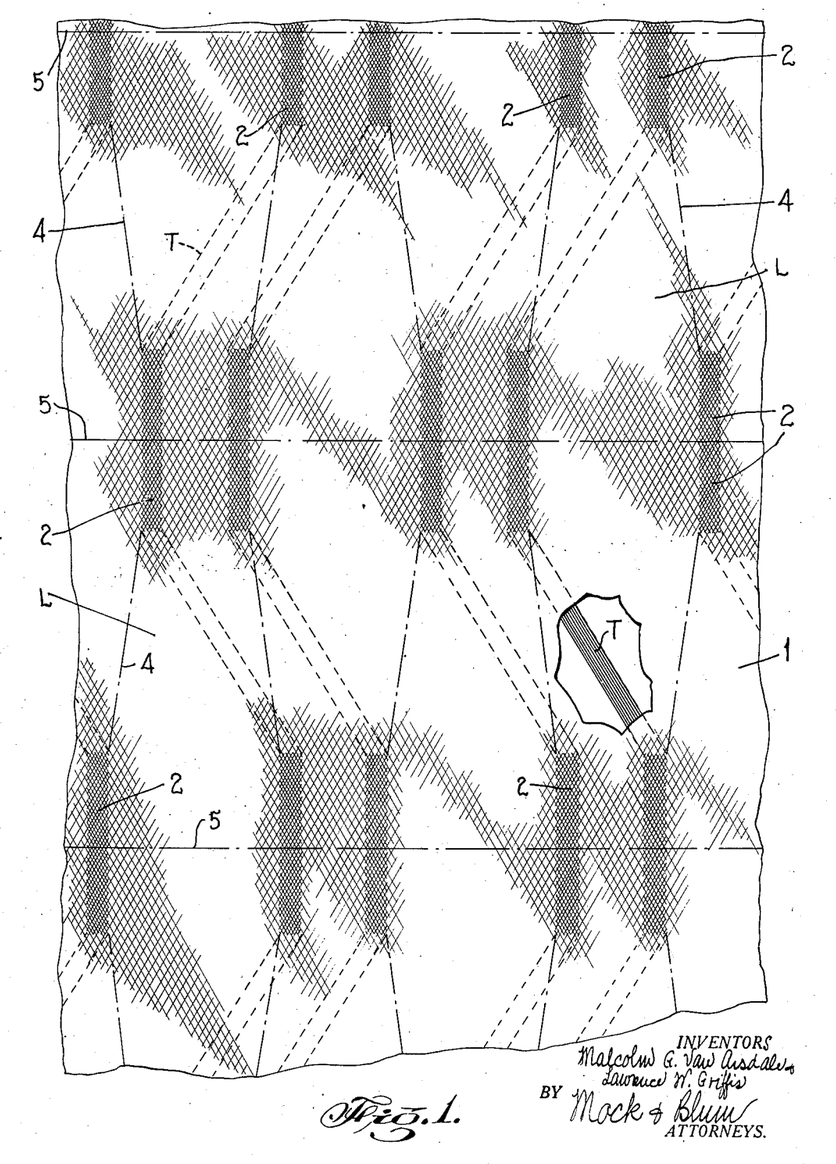
Fig. 1 is a plan view showing a large piece of warp-knit material, suitably reinforced at predetermined zones, from which a number of blanks can be cut for making individual stockings.

In order to manufacture the improved stocking in a quick and economical manner, a piece of tricot or any suitable warp-knit material 1 is knitted upon any suitable warp-knitting machine. The invention is not restricted to any particular weight or style of the warp-knit material, and the meshes of the warp-knit material may be made of any desired size.

The piece of warp-knit material may also be made of any desired size. The warp-knit material 1 is provided with reinforced zones. These reinforced zones 2, are provided by interknitting an extra thread or threads into the fabric at the zones 2, so that the zones 2 can have any desired excess strength. Likewise, the meshes of the zones 2 can be made smaller than the meshes of the intermediate part of the fabric.

The extra thread or threads which are used to reinforce the zones 2 may be confined to said zones during the knitting operation, and this is preferable. If said extra thread or threads T are extended between the zones 2, during the knitting operation, said extra thread or threads T can be cut out or eliminated in any desired manner.

A knit piece of fabric is made large enough to provide a number of leg sections or blanks L. The sheet of fabric is therefore cut along the lines 4 and 5 in order to provide leg blanks or sections.

It will be noted that the zones 2 are arranged in sets of four, each said set comprising a pair of relatively closely spaced zones and a pair of relatively widely spaced zones. The inclined longitudinal cuts, corresponding to the lines 4, are made along the outer margins of the closely spaced zones, and along the inner margins of the widely spaced zones.

Figure 2:
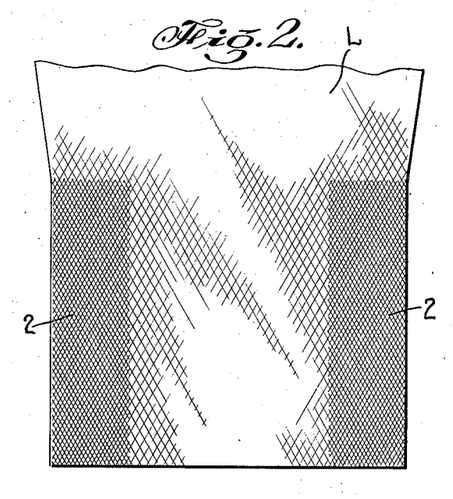
Fig. 2 is a plan view of a lower end of the leg blank or section, after it has been cut from the large piece of material shown in Fig. 1.

Hence the leg blank L has no reinforced zones at its upper end, and it has a pair of reinforced zones at its lower end. This method of cutting permits the most economical utilization of the warp-knit fabric, as there is no waste of the material at the widely spaced zones.

Figure 3:
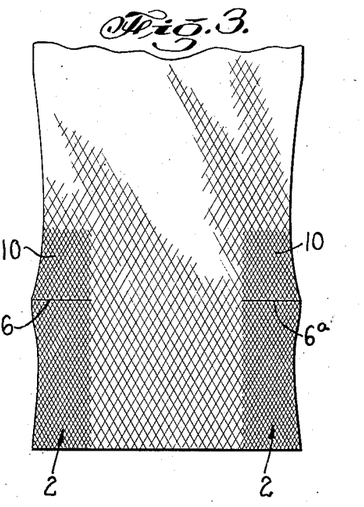
Fig. 3 is a plan view showing the lower end of the blank illustrated in Fig. 2, after this has been shaped and slitted. In actual practice the width of the blank shown in Fig. 3 is the same as the width of the blank shown in Fig. 2, Fig. 3 being on a reduced scale.

After a leg blank has been cut out, the side walls of the lower end thereof are suitably shaped as shown in Fig. 3, and cuts are formed along the lines 6 and 6a, in the reinforced zones 2, so as to separate reinforced zones 10 therefrom. The material of the leg blank can be separated along the lines 6 and 6a, so that the heel tabs can be knitted to the lower margins of the zones 10.

Figure 4:
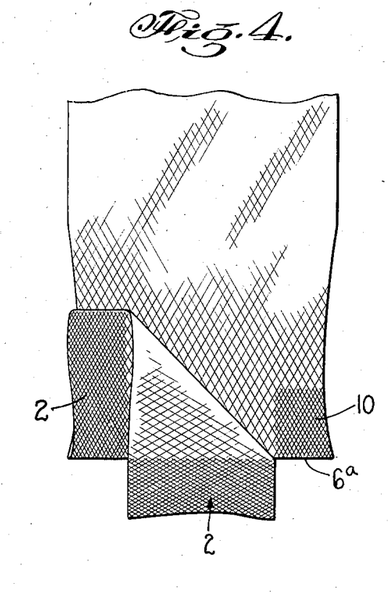
Fig. 4 is a plan view showing how some of the material of the slitted blank which is illustrated in Fig. 3 can be bent away from the body of said blank, in order to permit the attachment of the heel tabs.
Figure 5:
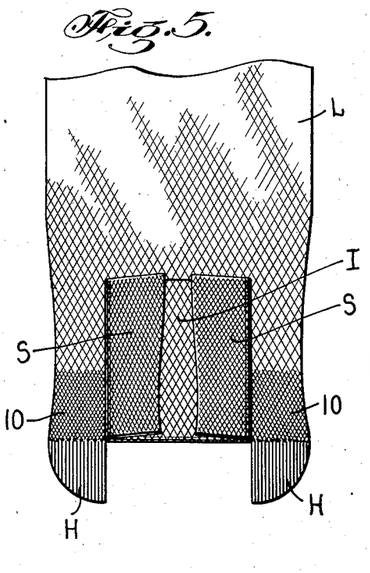
Fig. 5 is a plan view showing how some of the material of the blank illustrated in Fig. 3 has been folded out of the way, and how the heel tabs are attached.

It is desirable to simultaneously knit the heel tabs to the zones 10, and the lower part of each leg blank is therefore folded upwardly as shown in Fig. 5, so that the heel tabs H can be knitted to the lower margins of the zones 10.

In Fig. 5 the instep portion of the stocking is designated by the reference letter I, and the sole portion of the stocking is designated by the reference letter S, it being understood that the stocking is finished by suitable means as will be later described.

The heel tabs H are made of weft knit material in order to provide the necessary stretch for this section of the stocking.

Figure 6:
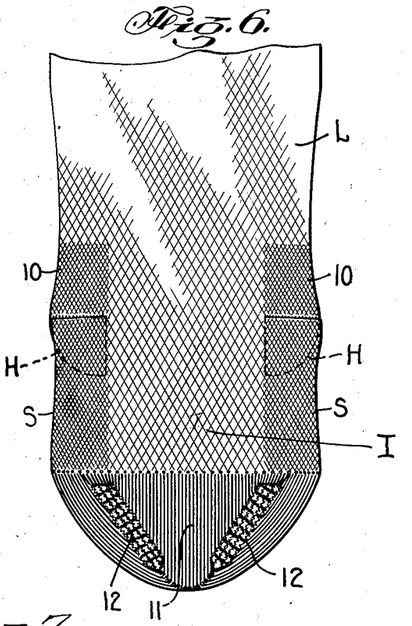
Fig. 6 is a plan view showing the toe attached to the leg blank.
Figure 7:
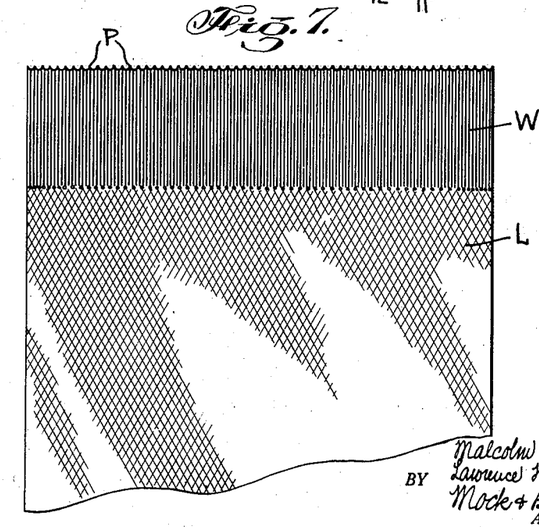
Fig. 7 is a plan view showing the welt of the stocking connected to the top of the leg blank or section.

Likewise, the toe portion 11 of the stocking is also made of ordinary weft knit material, in order to provide sufficient elasticity at this point, and the welt W is also made of ordinary weft-knit material. The welt W may have a picot edge P.

In order to provide the finishing sections of the stocking, such as the welt, the toe, and the heel tabs, the usual transfer and finishing machines are utilized, such as the footer, etc.

Figures 8, 9, 10, 11:
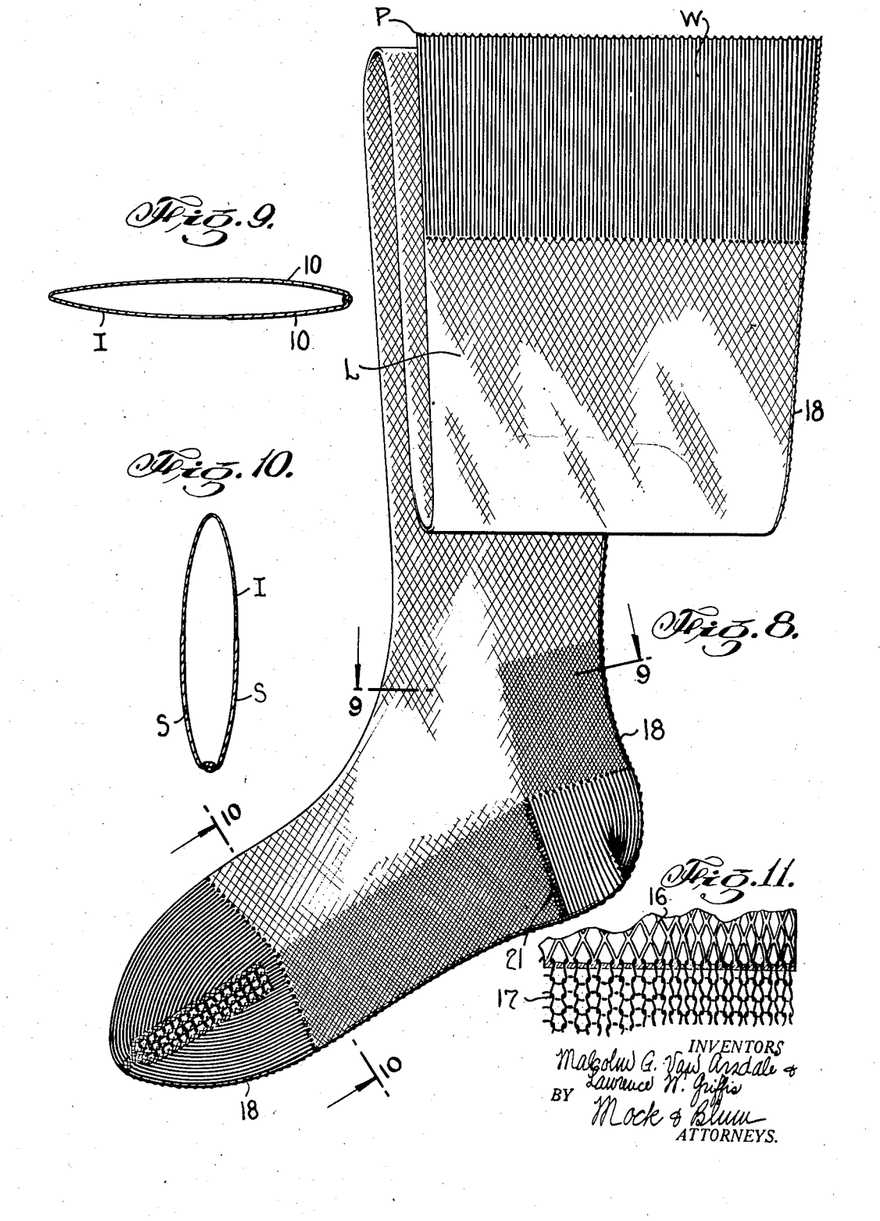
Fig. 8 is a plan view showing the completed stocking.
Figs. 9 and 10 are respectively sectional views on the lines 9—9 and 10—10 of Fig. 8.
Fig. 11 is a diagrammatic view illustrating one of the methods of connecting to the leg section, another section of the stocking, such as the welt, the toe, or the heel.

Fig. 11 shows how the meshes 16 of the warp-knit material can be connected to the loops 17 of a finishing section made of weft-knit material, such as a welt or a heel tab or the like.

For this purpose the meshes 16 are placed upon a transfer bar having points of the ordinary type.

Fig. 11 shows how a stocking section made of weft-knit material, is knitted to the meshes 16 of the leg blank. Referring to Fig. 5, the zones 10 have said meshes 16. The central meshes of 16 of said zones 10 are first placed upon the transfer points and the other meshes 16 are then placed upon said points, proceeding in opposite directions from said central meshes. The transfer points are spaced so that the central meshes 16 are stretched somewhat as they are placed on said transfer points, and the outer meshes in zones 10 are relatively unstretched when they are placed on said transfer points. As shown in Fig. 5, the heel tabs H are connected to the edges of the blanks which have been formed by the cuts 6 and 6a, and the material below said cuts is used to form the sole and the instep of the stocking.

This is diagrammatically shown in Fig. 11, from which it can be seen that the meshes 16 in the median portion of the blank are wider than the meshes at the right-hand side portion of the blank.

When the warp-knit material is originally knitted, the meshes of the reinforced zones are preferably of the same size, and they are smaller than the meshes of the remainder of the blank, said meshes of the remainder of the blank being also preferably of the same size. A mesh or open-work stocking can therefore be readily produced.

Figure 12:
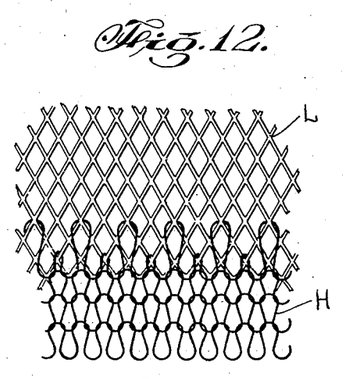
Fig. 12 is a diagrammatic view showing another and better method of connecting the leg blank of a stocking section with another part thereof.
Figure 12A:
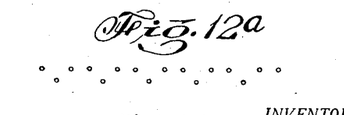
Fig. 12a is a diagrammatic view showing the arrangement of the transfer points, in order to practice the method illustrated in Fig. 12.

In order to avoid any relative stretch of the meshes of the leg blank when a welt or the like is to be connected thereto, the method illustrated in Figs. 12 and 12a can be utilized. Fig. 12a diagrammatically shows the arrangement of the transfer points.

In the method illustrated in Fig. 11, these transfer points are located on a single straight line, in the usual manner.

In Fig. 12a, some of the transfer points are shown as being offset. In the particular arrangement shown in Fig. 12a, the transfer points are arranged in two parallel straight line groups, one of said lines of transfer points having two points for each point of the other group. The transfer points can be arranged in any suitable combination in a plurality of lines.

Due to this arrangement the warp-knit material and the weft-knit material are interknit as shown in Fig. 12, and it can be seen that the connecting loops of the weft-knit material which are directly connected to the meshes of the warp-knit material comprise alternate long loops and short loops. Each long connecting weft-loop is equal in length to two of the mesh loops, and this relation can be varied as desired.

The improved stocking is completed by means of stitches 18 and 21, and if desired any well known finishing operations may be employed for forming the full-fashioned stocking from the blank which is thus produced.

While the production of a full-fashioned stocking has been illustrated, the invention is not necessarily limited to the production of a full-fashioned stocking.

The improved stocking has a leg L which is integral with the instep and with the sole, and these parts of the stocking are made of warp-knit material, and the sole section is reinforced. Likewise, the ankle of the stocking is also reinforced, and the only parts of the stocking which are made of weft-knit material are the toe and the heel and the welt.

While the invention is not to be limited to the production of an open mesh stocking, it permits the manufacture of this relatively expensive type of stocking in an economical manner, and the stocking is much more durable than the ordinary mesh stocking, which is made of weft-knit material.

It is not necessary to partially form the heel tabs, etc. from ordinary weft-knit material, and it is frequently desirable to eliminate the necessity of using such weft-knit material.

Figure 13:
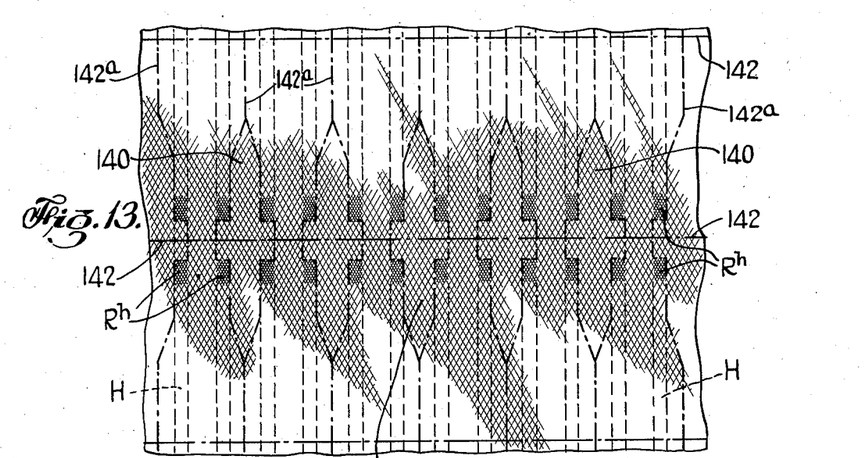
Fig. 13 is a plan view showing a large piece of warp knit material suitably reinforced at predetermined zones, in which the heel tabs are made sufficiently large to form the heel of the stocking so that it is unnecessary to complete the heel of the stocking by means of ordinary weft knit material.

Referring to Fig. 13 for example, this illustrates a piece of warp knit fabric having reinforced and warp knitted zones or areas R*h* which comprise the complete heel tabs of the stocking, so that it is unnecessary to knit weft-knit material to form said heel tabs. The fabric shown in Fig. 13 is cut along the lines 142 and 142a leaving waste areas 140.

Figure 14:
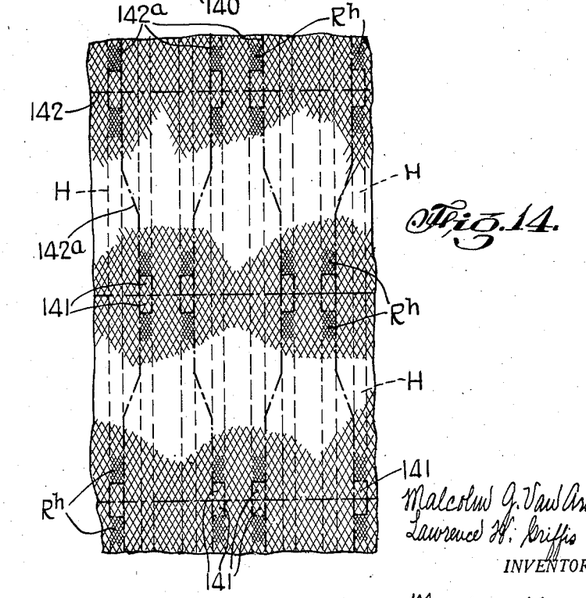
Fig. 14 shows another type of fabric made of warp knit material and having reinforced areas of sufficient size to form the heel tabs of the stocking, said reinforced areas being also formed by interknitting additional warp thread.
Figure 16:
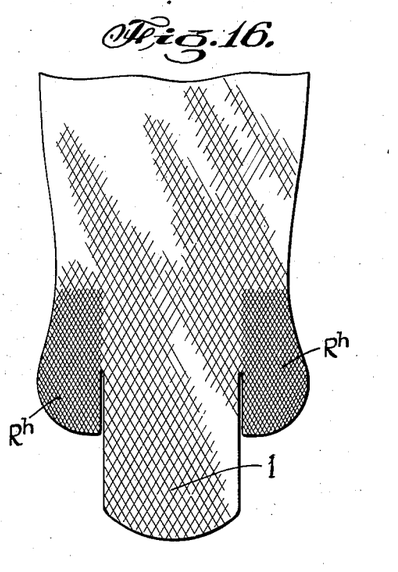
Fig. 16 shows how a stocking blank is cut from the blank shown in Fig. 15.

In the embodiment shown in Fig. 14 and Fig. 16, reinforced heel tabs R*h* are also provided, but the spacing of said zones is different. Hence when the fabric is cut along the lines 142 and 142a, relatively small waste areas 141 are formed.

Figure 15:
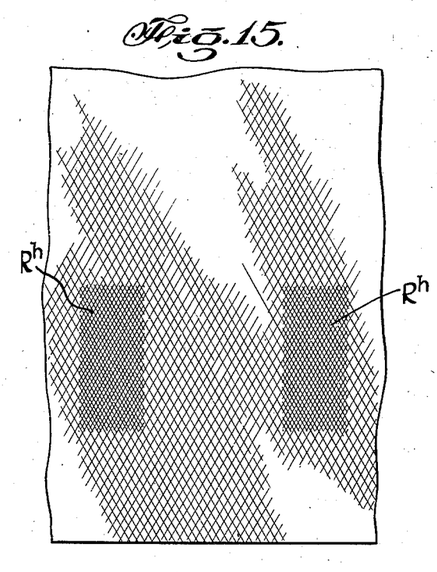
Fig. 15 is a partial view of a stocking blank which is cut from the material shown in Figs. 13 and 14.

As shown in Fig. 15, a stocking blank which is formed by cutting the material shown in Fig. 14, has reinforced zones R*h*, formed by the use of an extra warp thread or warp threads, and as shown in Fig. 16, these zones R*h* form the complete heel tabs for the stocking. The blank is cut so as to provide an instep I.

Figure 17:
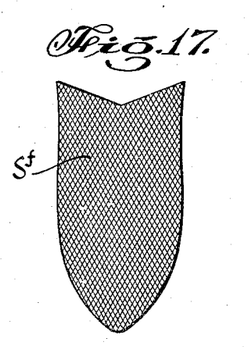
Fig. 17 is a plan view of the reinforced sole of the stocking.
Figure 18:
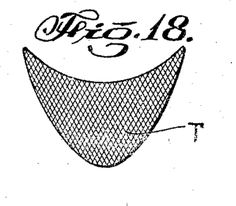
Fig. 18 is a plan view of the reinforced toe portion of the stocking, it being understood that the instep and the toe portion may be made of warp knit material.

Figs. 17 and 18 respectively illustrate the separately knitted sole portion S*f* and the separately knitted toe portion T. These may consist of warp knit material.

Figure 19:
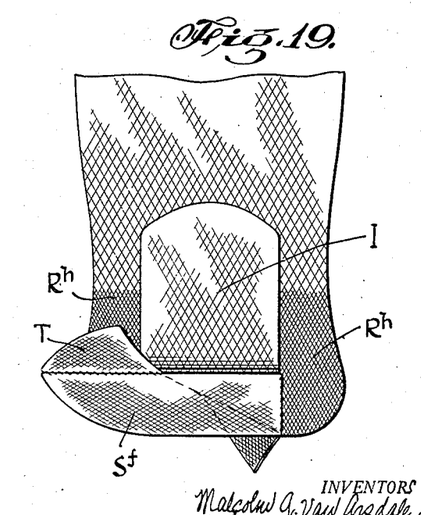
Fig. 19 shows the assembly of a stocking from the warp knit parts previously depicted.

Fig. 19 illustrates the assembly of these parts, which may be accomplished by suitably stitching them together or interconnecting them in any suitable manner.

Figure 20:
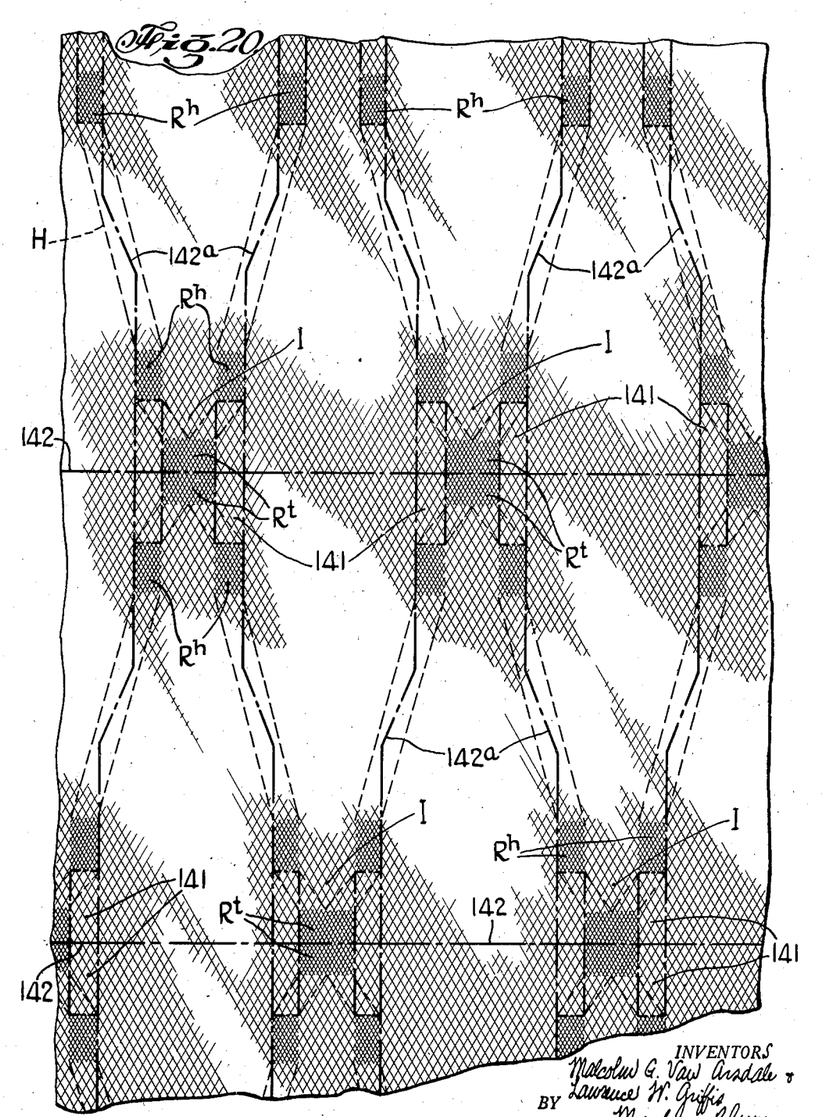
Fig. 20 is a plan view of a large piece of warp knit fabric having reinforced and warp knitted zones, and showing the formation of reinforced zones for the toe portion of the stocking.

Fig. 20 shows the knitting of a warp knit fabric, having reinforced and warp knitted zones which form the toe portions R*t* as well as the heel tabs R*h*. This fabric is cut along the lines 142 and 142a, and the intermediate warp threads H which are located between adjacent reinforced zones can be cut or removed in any suitable manner. The waste areas 141 are relatively small.

Figures 21, 22, 23:
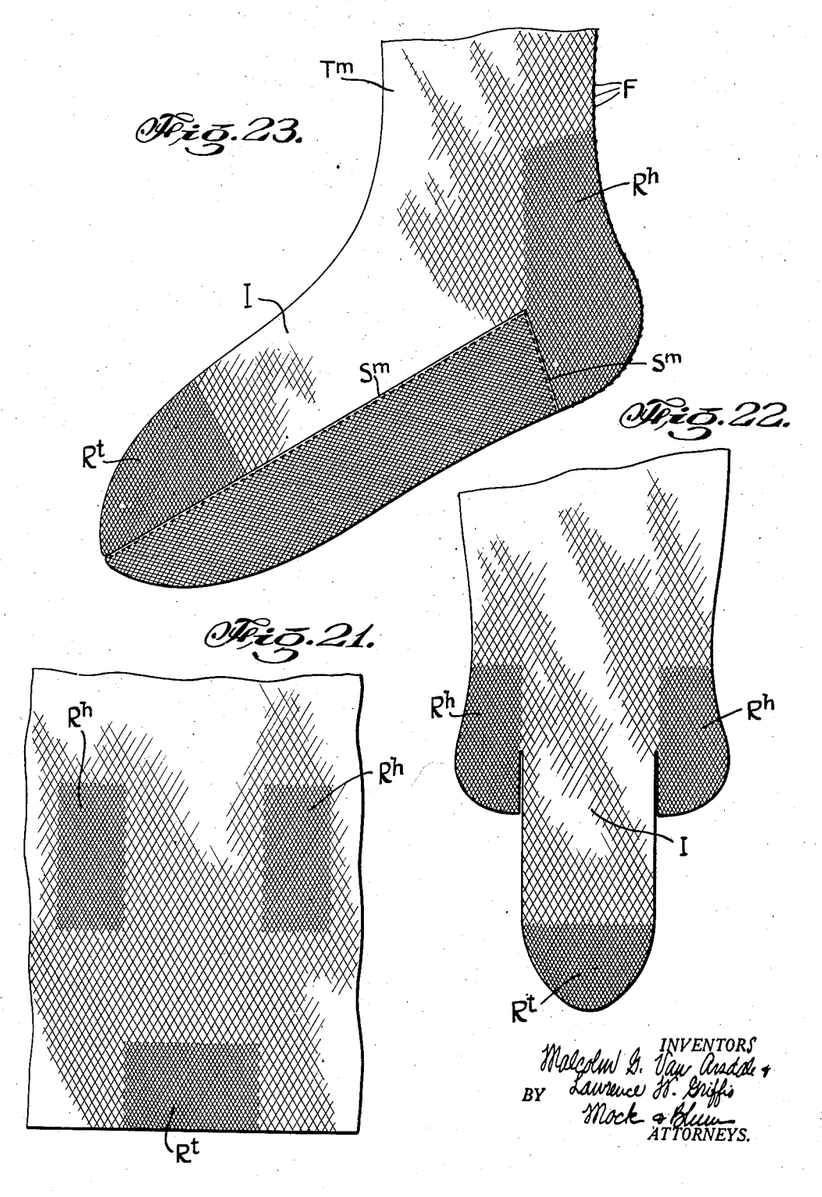
Fig. 21 shows the essential part of a blank which is cut from the fabric shown in Fig. 20.
Fig. 22 shows how the blank illustrated in Fig. 21 is cut, in order to produce the stocking.
Fig. 23 shows a completed stocking made from the blank shown in Fig. 22.

Fig. 21 illustrates the cutting of the blank from the material shown in Fig. 20, so as to form complete heel tab zones R*h* and a toe member R*t*.

Fig. 22 illustrates the cutting of the stocking from the blank shown in Fig. 21.

Fig. 23 illustrates the complete stocking having a leg portion T*m*, the various sections being joined by stitches S*m* or any other suitable manner.

A row of finishing stitches F may be utilized along the back of the partially finished stocking.

We have shown a preferred embodiment of our invention, but it is clear that numerous changes and omissions can be made without departing from its spirit.

We claim:

1. A stocking having a part made of warp-knit material and a part made of weft-knit material, the loops of said weft-knit material being directly interknit with the meshes of the warp-knit material, said loops which are directly interknit with the meshes of the warp-knit material being of varying length.

2. A stocking having a part made of warp-knit material and a part made of weft-knit material, the loops of said weft-knit material being directly interknit with the meshes of the warp-knit material, said loops which are directly interknit with the meshes of the warp-knit material being of varying length and being alternately of greater and lesser length.

3. In the art of making a stocking of warp-knit material, those steps which consist in knitting a piece of warp-knit material while producing reinforced zones therein, said zones being arranged in sets of four, each said set comprising a pair of relatively closely spaced zones and a pair of relatively widely spaced zones, cutting said material transversely across all of said zones, and also cutting said material along the inner edges of the widely spaced zones and along the outer edges of the closely spaced zones, in order to produce a tapered blank of warp-knit material having reinforced zones at the side walls of the narrow end thereof.

4. In the art of making a warp-knit stocking from a tapered warp-knit blank having a pair of reinforced zones along the side walls of the narrow end thereof, those steps which consist in transversely cutting said zones intermediate the ends thereof, connecting the heel tabs to the edges formed by said cuts at the lower end of the body of the blank, and utilizing the remainder of the warp-knit material at the lower end of the blank to form the sole and the instep of the stocking.

5. In the art of making a stocking of warp knit material, those steps which consist in knitting a piece of warp knit material having reinforced zones corresponding to the heels of the stockings and also having reinforced zones corresponding to the toes of the stockings, and then cutting said warp knit material in order to form tapered leg blanks, each said leg blank having the reinforced zones corresponding to the heel of the stocking extending inwardly from the side walls of the narrow end thereof, each said leg blank having a reinforced zone corresponding to the toe of the stocking at the end wall of the narrow end thereof, the reinforced zone corresponding to the heel of the stocking being longitudinally spaced from the reinforced zones corresponding to the toe of the stocking.

6. In the art of making a stocking of warp knit material, those steps which consist in knitting a piece of warp knit material having reinforced zones which form at least parts of the reinforced heel tabs of said stocking, said reinforced zones being located in longitudinal rows, the lateral distances between the zones of adjacent rows being alternately relatively large and relatively small, and then cutting said piece of material so as to form tapered leg blanks, each said leg blank having a pair of said reinforced zones located inwardly of the side walls of the narrow end thereof.

7. In the art of making a stocking of warp knit material, those steps which consist in knitting a piece of warp knit material having reinforced zones which form at least parts of the reinforced heel tabs of said stocking, said reinforced zones being located in longitudinal rows, the lateral distances between the zones of adjacent rows being alternately relatively large and relatively small, and then cutting said piece of material so as to form tapered leg blanks, each said leg blank having a pair of said reinforced zones located inwardly of the side walls of the narrow end thereof, said piece of warp knit material being also made with reinforced zones corresponding to the toes of the stocking, said reinforced toe zones being located between and adjacent to the reinforced heel-portion zones which are relatively close to each other, the fabric being cut so that the end wall of the narrow end of each blank is provided with a reinforced toe-portion zone.

MALCOLM G. VAN ARSDALE.
LAWRENCE W. GRIFFIS.